United States Patent
Mull et al.

(10) Patent No.: US 9,037,934 B2
(45) Date of Patent: May 19, 2015

(54) DEMULTIPLEXING A PACKET-BASED TRANSPORT STREAM

(71) Applicant: Fraunhofer-Gesellschaft zur Foerderung der Angewandten Forschung e.V., Munich (DE)

(72) Inventors: Andreas Mull, Nuremberg (DE); Christian Forster, Nuremberg (DE); Rainer Hildinger, Bamberg (DE); Heinz Gerhaeuser, Waischenfeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/166,515

(22) Filed: Jan. 28, 2014

(65) Prior Publication Data

US 2014/0143626 A1 May 22, 2014

Related U.S. Application Data (63) Continuation of application No. PCT/EP2012/064611, filed on Jul. 25, 2012.

(30) Foreign Application Priority Data

Jul. 28, 2011 (EP) .................................... 11175784

(51) Int. Cl.
  *H04L 1/00* (2006.01)
  *G06F 11/00* (2006.01)
(52) U.S. Cl.
  CPC .............. *H04L 1/004* (2013.01); *H04L 1/0045* (2013.01); *H04L 1/0047* (2013.01)
(58) Field of Classification Search
  CPC ..... H04L 1/0003; H04L 1/006; H04L 1/0009; H04L 1/0026; H04B 7/0443
  USPC ........ 714/747, 755, 786, 780, 794–795, 776; 375/262, 341, 267, 148; 370/329, 342
  See application file for complete search history.

(56) References Cited

U.S. PATENT DOCUMENTS

| 2007/0147481 | A1* | 6/2007 | Bottomley et al. | ........... 375/148 |
| 2010/0008444 | A1* | 1/2010 | Ionescu et al. | ................ 375/267 |

FOREIGN PATENT DOCUMENTS

| EP | 1335604 | 8/2003 |
| EP | 2086234 | 8/2009 |
| EP | 2194668 | 6/2010 |

OTHER PUBLICATIONS

"ATSC A/53", Standard ATSC A/53, Part 1; Aug. 2009. ATSC Digital Television Standard: Part 1 Digital Television System. http://www[www]. atsc. Orgl.

(Continued)

*Primary Examiner* — Guy Lamarre
(74) *Attorney, Agent, or Firm* — Michael A. Glenn; Perkins Coie LLP (57) ABSTRACT

A device for demultiplexing a packet-based transport stream of transport stream packets each provided with a systematic forward error detection code is described. The transport stream packets are each allocated to one of a plurality of data sinks, so that in a payload data section of the transport stream packets allocated to the same data sink a data stream of forward error protection code-protected data packets which are addressed to the respective data sink is embedded. The device determines, for a transport stream packet which is erroneous according to the systematic forward error detection code, a probability value for each of the plurality of data sinks which indicates how probable it is that the predetermined transport stream packet is allocated to the respective data sink, and allocates the predetermined transport stream packet to a selected one of the plurality of data sinks.

18 Claims, 3 Drawing Sheets

(56) References Cited

OTHER PUBLICATIONS

"Digital Video Broadcasting Project (DVB) (Hrsg.): Digital Video Broadcasting (DVB) *MPE-IFEG*", Digital Video Broadcasting Project (DVB), Nov. 2008. (DVB Bluebook A131) . http://www.dvb[dvb]. Orgl.

"Digital Video Broadcasting Project (DVB) (Hrsg.): DVB-H *Implementation Guidelines*", Digital Video Broadcasting Project (DVB), May 2007. (DVB Bluebook A092r2) . http://www[www]. dvb. Orgl.

"Digital Video Broadcasting Project (DVB) (Hrsg.): IP Datacast over DVBH: *Content Delivery Protocols* (CDP)", Digital Video Broadcasting Project (DVB), Dec. 2005. (DVB Bluebook A101) . http://www[www]. dvb. Orgl.

"*ETSI EN 301 192*", Standard ETSI EN 301 192; Apr. 2008. Digital Video Broadcasting (DVB); DVB specification for data broadcasting. http://www[www]. etsi. Orgl.

"*ETSI EN*", Standard ETSI EN 302 304; Nov. 2004. Digital Video Broadcasting (DVB); Transmission System for Handheld Terminals (DVB-H). http://TilWW[TilWW] . etsi. Orgl.

"*ETSI TS 102585*", ETSI TS 102585; 042008. Digital Video Broadcasting (DVB); System Specifications for Satellite services to Handheld devices (SH) below 3 GHz. http: llwww.etsi.org.

"*ETSI TS 102 584*", Digital Video Broadcasting (DVB);DVB-SH Implementation Guidelines Issue 2. http://www.dvb[dvb]. Orgl.

"Standard *ISO/IEC 13818-1*", Dec. 2000. Information technology—Generic coding of moving pictures and associated audio information: Systems. http://www[www]. iso. Org.

Deering, S., "Host Extensions for IP Multicasting", Internet Engineering Task Force, Aug. 1989. (RFC 1112) . http://tools[tools] . ietf.org/html/rfc1112.

Jaekel, Torsten , "DVB-H Data Mapping. May 2006.—DiBroC", DVB-H Data Mapping. May 2006.—DiBroC.

Koppelaar, Arie et al., "Restoration of IP-datagrams in the DVB-H link-layer for TV on mobile.", In. Proc. Digest of Technical Papers. International Conference on Consumer Electronics ICCE '06, 2006, S. 409-410.

Paavola, J. et al., "The Performance Analysis of MPE-FEC Decoding Methods at the DVB-H Link Layer for Efficient IP Packet Retrieval", In: IEEE Transactions on Broadcasting 53 (2007),3, S. 263-275. http://dx.doI.org/10.1109/TBC.2007.891694[dx.doI.org].—DOI 10.1109/TBC.2007.891694.

Schulzrinne, H., "RTP: A Transport Protocol for Real-Time Applications", Columbia University, Jul. 2003.

\* cited by examiner

DEMULTIPLEXING A PACKET-BASED TRANSPORT STREAM

CROSS-REFERENCE TO RELATED APPLICATIONS

This application is a continuation of copending International Application No. PCT/EP2012/064611, filed Jul. 25, 2012, which is incorporated herein by reference in its entirety, and additionally claims priority from European Application No. 11175784.5, filed Jul. 28, 2011, which is also incorporated herein by reference in its entirety.

BACKGROUND OF THE INVENTION

The present invention relates to demultiplexing a packet-based transport stream of transport stream packets each provided with a systematic forward error detection code, wherein the transport stream packets are each allocated to one of a plurality of data sinks.

Encapsulating data streams into another one is common practice and forms the basis for example for the OSI layer model. A packet-based transport stream of transport stream packets for example transports one or several data streams which in turn again comprise data packets by the data packets being embedded into the payload data sections of the transport stream packets. With DVB-H, for example, MPE sections and MPE-FEC sections are embedded into the payload data sections of transport stream packets and IP packets are again embedded into the payload data sections of the MPE sections.

For each transport stream, of course, not only one data stream may be transmitted. For each multiplex, several data streams may be transmitted via one common transport stream. The different receivers or data sinks are for example associated with different programs, like e.g. TV programs or radio programs. When multiplexing the data packets of the different receives or data sinks, the latter are embedded into the transport stream packets so that in one transport stream packet each only one section of one of the data streams is contained, i.e. each transport stream packet is allocated to exactly one data sink. The allocation of the transport stream packets to the data sinks is indicated in the interior of the transport stream packets, in a so-called transport stream header.

If, however, an FEC protection of a current transport stream packet indicates that the same is erroneous, a demultiplexer on the receive side may not rely on the fact that the indicated receiver or the addressed data sink in fact corresponds to the actual receiver or the actual addressed data sink. Consequently, the transport stream packet is discarded and supplied to none of the data sinks in order to prevent forwarding faulty data to the data sinks.

The actually addressed data sink, however, thus lacks one section of the data stream addressed to the same which may lead to high data losses. If the data packets are embedded into the payload data sections of the transport stream packets, for example by fragmentation, when losing a transport stream packet addressed to the respective data sink not only the section from the data stream addressed to the same was lost but possibly also any data packet of which a part was allotted into the lost transport stream packet. In case of an interleaver-based FEC protection of the data stream, the missing of a section from the data stream may apart from that lead to an erroneous filling in of the interleaver table, so that the complete section of the data stream in the interleaver table at the respective data sink has to be discarded.

It is the object of the present invention to provide a concept for demultiplexing a packet-based data stream which leads to a more effective data transmission to the different data sinks.

SUMMARY

According to an embodiment, a device for demultiplexing a packet-based transport stream of transport stream packets each provided with a systematic forward error detection code, wherein the transport stream packets are each allocated to one of a plurality of data sinks, so that in a payload data section of the transport stream packets allocated to the same data sink a data stream of forward error protection code-protected data packets is embedded addressed to the respective data sink, may be implemented to: determine, for a predetermined transport stream packet which is erroneous according to the systematic forward error detection code, a probability value for each of the plurality of data sinks which indicates how probable it is that the predetermined transport stream packet is allocated to the respective data sink, and allocate the predetermined transport stream packet, on the basis of the probability values for the plurality of data sinks, to a selected one of the plurality of data sinks.

According to another embodiment, a system for decoding a data stream which is addressed to a predetermined data sink from a packet-based transport stream of transport stream packets each provided with a systematic forward error detection code, may have: a device for demultiplexing as mentioned before; and a decoder for decoding the data stream embedded into the payload data sections of the transport stream packets allocated to the predetermined data sink by the device.

According to another embodiment a method of demultiplexing a packet-based transport stream of transport stream packets each provided with a systematic forward error detection code, wherein the transport stream packets are each allocated to one of a plurality of data sinks, so that in a payload data section of the transport stream packets allocated to the same data sink a data stream of forward error protection code-protected data packets is embedded addressed to the respective data sink, may have the steps of: determining, for a predetermined transport stream packet which is erroneous according to the systematic forward error detection code, a probability value for each of the plurality of data sinks which indicates how probable it is that the predetermined transport stream packet is allocated to the respective data sink, and allocating the predetermined transport stream packet, on the basis of the probability values for the plurality of data sinks, to a selected one of the plurality of data sinks.

Another embodiment may have a computer program having a program code for executing the above method of demultiplexing, when the program is executed on a computer.

The present invention is based on the finding that a more effective demultiplexing of a packet-based transport stream may be acquired when, for a predetermined transport stream packet which is erroneous according to its systematic forward error detection code, a probability value is determined for each of the plurality of data sinks which indicates how probable it is that the predetermined transport stream packet is allocated to the respective data sink in order to then allocate the predetermined transport stream packet, on the basis of the probability values for the plurality of data sinks, to a selected one of the plurality of data sinks, like e.g. the one for which the maximum probability value was determined.

According to embodiments of the present invention, most different characteristics of the payload data sections of the transport stream packets addressed to a respective data sink are used to determine the respective probability value for the respective data sink. For example, redundancies in the data packets of the data stream addressed to the respective data sink may be evaluated, like e.g. the forward error detection data for the protection of data packet headers of the data packets of the respective data stream or redundant, cross-layer address indications etc. Different fields in the data packets remain the same for the respective data sink across a longer period of time and this condition may also be used by any data sink. Such constant fields for example include address fields or the like. Apart from that, synchronization fields may exist in the data packets which have the same value and may thus also be used for forming or determining the respective probability value, for example as the probability of occurrence for the different data sinks varies differently across the transport stream packet. All of these indications may provide a contribution to the final probability value for the respective data sink. For example, the individual contributions are summed up.

BRIEF DESCRIPTION OF THE DRAWINGS

In the following, embodiments of the present invention are explained in more detail with reference to the drawings, in which.

DETAILED DESCRIPTION OF THE INVENTION

Figure 1:
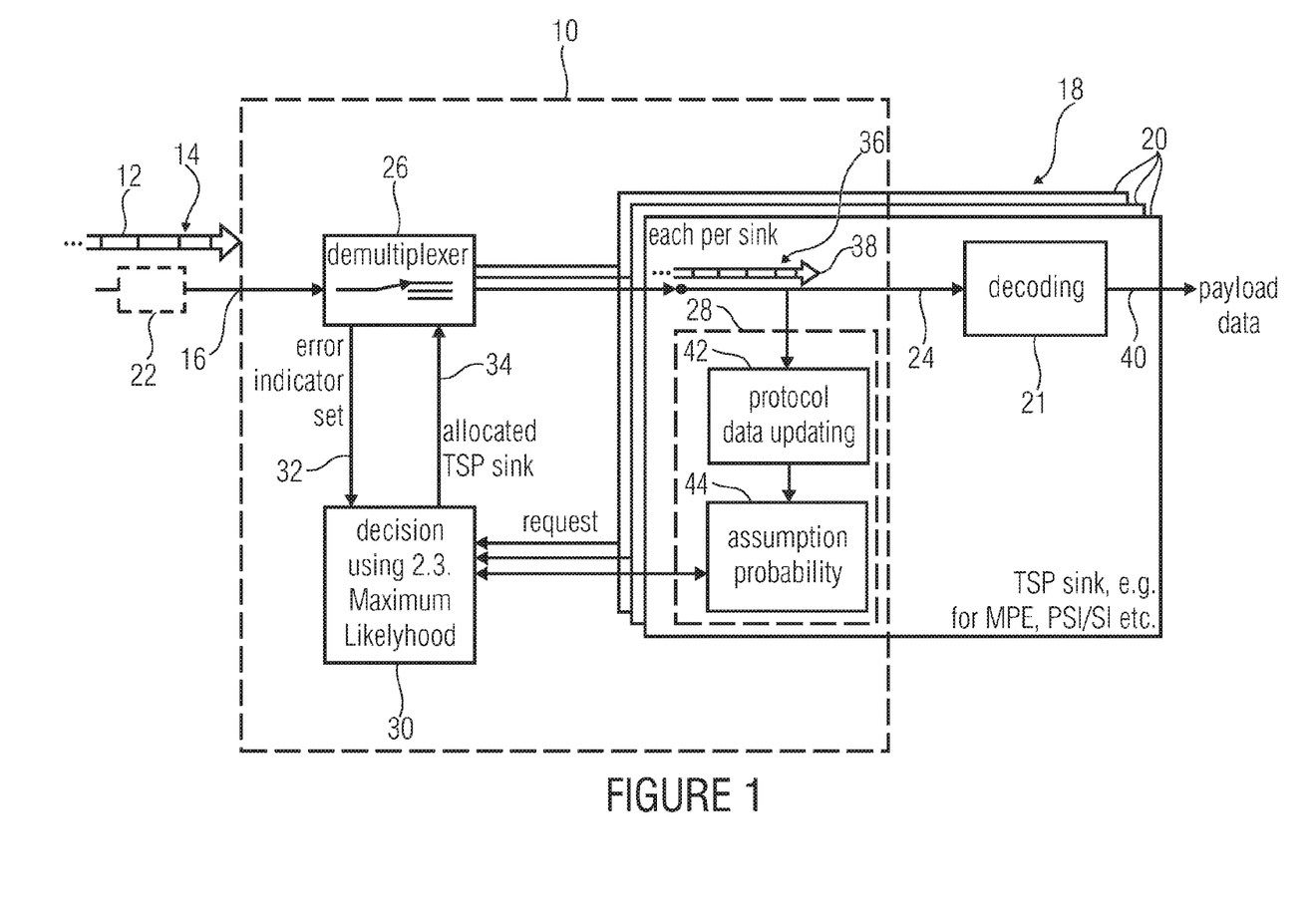
FIG. 1 is a block diagram of a device for demultiplexing a packet-based transport stream according to one embodiment.

FIG. 1 shows a device for demultiplexing a packet-based transport stream according to one embodiment of the present invention. In FIG. 1, the device is generally indicated by 10. The device 10 is thus used to allocate transport stream packets 12 of a transport stream 14 at an input 16 of the device 10 to a plurality 18 of data sinks 20 each comprising a decoder 21 which decodes the data stream allocated to the same.

The incoming transport stream packets 12, as will be described in more detail later with reference to FIG. 2 using a more concrete example, are each provided with a systematic forward error detection code and thus enable the determination whether or not the respective transport stream packet 12 is erroneous. The latter determination is, for example, executed by a transport stream error detector 22 optionally connected upstream from the input 16, so that, if applicable, already at the arrival of the transport stream packets 12 at the input of the device 16 the device 10 is informed whether the respective transport stream packet 12 is erroneous or not. Alternatively, this determination is executed in the device 10 itself.

Next to the input 16 for the transport stream 14, the device 10 thus comprises an output 24 per data sink 20 and internally includes a demultiplexer or distributor 26, one probability value determiner 28 and one allocator 30 per data sink. The allocator 26 is connected between the input 16 and the output 24. It is the task of the distributor to supply the transport stream packets 12 in the transport stream 14 to the respectively allocated data sink. In case of non-erroneous transport stream packets 12, the distributor 26 may gather the allocation of the individual transport stream packets to the individual data sinks 20 for example from the data stream packets 12 themselves, like e.g. a predetermined field in a transport stream packet header, as it will be described with reference to FIG. 2 using a concrete example. The distributor 26 receives the transport stream packets 12 one after the other from the transport stream 14 and passes on the current transport stream packet, if it is non-erroneous, to the allocated data sink 20. The other data sinks 20 do not receive this data packet.

In this respect, the distributor 26 includes an input connected to the input 16 and an output each for each of the outputs 24 for the data sinks 20. For each data sink 20, now also one input of the probability value determiner 28 for the respective data sink 20 is connected to the respective output of the distributor 26 to receive the transport stream packets 12 supplied to the respective data sink 20 by the distributor 26 at the input. It is briefly noted that according to an alternative embodiment, this connection between distributor 26 and the probability value determiners 28 may be missing when certain options for execution which are described in more detail in the following are not applied. This will again be discussed at the end of the specification.

The distributor 26 is implemented, when the current transport stream packet 12 is erroneous, to indicate this to the allocator 30 as indicated by an arrow 32. For this purpose, the distributor 26 is coupled to the allocator 30. As a response to the indication 32, the allocator 30 indicates to the distributor 26 to which data sink 20 the current transport stream packet 12 is to be allocated and forwarded, despite being erroneous, wherein this is indicated by the arrow 34. According to one embodiment, the message 34 may contain as a response option that the current transport stream packet 12 is actually to be discarded despite all measures to be explained in more detail in the following.

As explained in more detail with reference to FIG. 2, a data stream 36 of data packets 38 is embedded into payload data sections of transport stream packets 12 allocated to the same data sink. Strictly speaking, it may be the case that the distributor 26 is implemented to only forward the payload data section of a current transport stream packet 12 to the respectively allocated data sink 20 or the respective probability value determiner 28. In the ideal case in which the distributor 26 forwards each transport stream packet 12 or its payload data section to the correct receiver or the correctly addressed data sink 20 and the corresponding probability value determiner, at the input of the latter modules 20 or 28 the data stream 36 addressed to the respective data sink 20 results to be complete for the respective data sink 20. In this case, each data sink 20 or the respectively allocated decoder 21 would be able to decode the allocated data stream 36 to acquire payload data 40 in this way, like e.g. video or audio data or the like coming from the payload data sections of the data packets 38.

The probability value determiners 28 existing for each data sink 20 are now here to determine, for a current transport stream packet 12 for which the distributor 26 indicates 32 the faultiness, a probability value which indicates to what probability the actual transport stream packet 12 is allocated to the respective data sink 20, that is on the basis of information of the payload data section of the predetermined transport stream packet 12 which is, for example, for the allocator 30 for this purpose forwarded from the distributor 26 to the probability value determiner 28. For determining the probability values there is a plurality of different options which are to be explained in more detail in the following. As illustrated in FIG. 1, each probability value determiner 28 may be divided into two parts, i.e. a protocol data updating part 42 for joining the payload data sections of the transport stream packets 12 hitherto forwarded to the respective data sink 20, and an assumption probability determination part 44, wherein this form of subdivision is only exemplary.

For each data sink 20, the allocator 30 receives a probability value from the respective probability value determiner 28 and determines, on the basis of those probability values, which data sink 20 the current transport stream packet 12 is to be allocated to or, according to one embodiment, if no allocation should take place, as the probability values are not significant enough. The allocator 30 is for example implemented to allocate the current transport stream packets 12 to the data sink 20 for which the probability value is maximal.

As it will be explained in more detail in the following, the probability value determiners 28 are for example implemented to determine the probability value on the basis of a plurality of single probability values, like e.g. by summing up the latter, wherein those single probability values for example are a measure for a similarity of a section of the payload data section of the current transport stream packet 12 with respect to a content which ought to be located in the current transport stream packet at the respective position with high probability if it is assumed that the current transport stream packet represents a complete continuation of the already received part of the data stream 36 of the respective data sink 20 (i.e. without losing one of the preceding transport stream packets for the respective data sink), or which is present with a high probability at the corresponding or a random section of the payload data section of a transport stream packet 12 allocated to the respective data sink, independent of the fact which transport stream packet of transport stream packets allocated to the respective data sink is currently dealt with. As mentioned above, the process will become clearer from the following specification.

Figure 2:
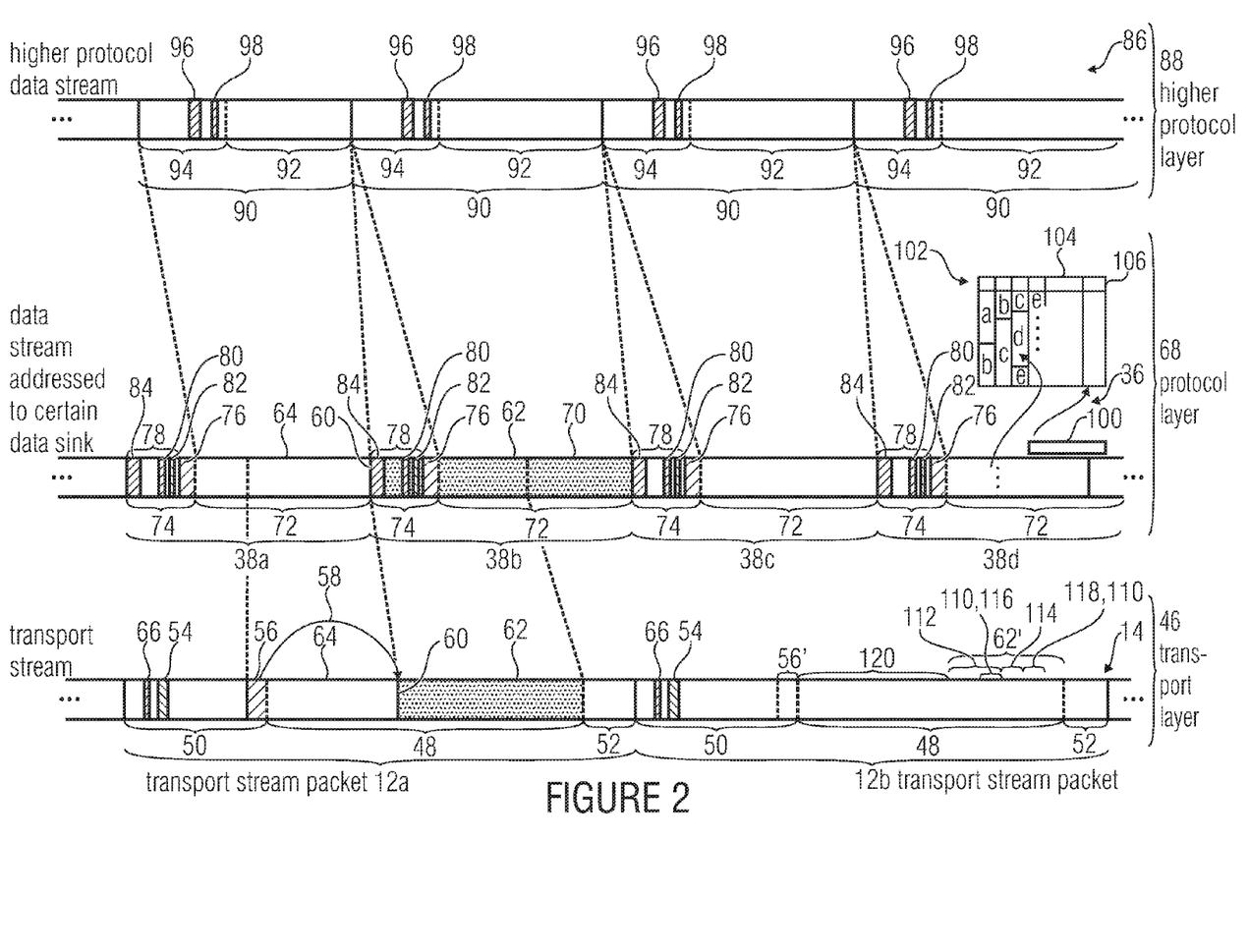
FIG. 2 is a schematic illustration of an exemplary setup of a packet-based transport stream next to a data stream addressed to a predetermined data sink, according to one embodiment.

With reference to FIG. 2, now an embodiment for a possible setup of the transport stream packets 12 and the data packets 38 is described. With respect to the setup of the data packets 38 it is noted that the same may be for all data sinks 20 as described now with reference to FIG. 2, or that the setup may also be different for the data sinks 20, i.e. for some data sinks 20 as illustrated with reference to FIG. 2, and different for others.

At the bottom FIG. 2 shows an exemplary section of the transport stream 14 with a transport stream packet 12a and a directly following transport stream packet 12b. In this part of FIG. 2, thus so to speak the transport layer 46 is illustrated. As illustrated in FIG. 2, each transport stream packet 12a and 12b comprises a transport stream packet header 50, for example next to the payload data section 48. Apart from that, each transport stream packet 12a, 12b additionally comprises a systematic forward error detection code 52, i.e. redundancy data 52 which enables a detection of errors in the respective transport stream packet 12a or 12b by systematic forward error detection. If applicable, the data 52 further enables a forward error correction. The redundancy data 52 may protect the transport stream packet 12a or 12b for example completely or only with respect to the header 50 or even only with respect to an identification indication 54. Within the transport stream packet header 50, for example, a field or an identification indication 54 is located which identifies the data sink 20 to which the respective transport stream packet 12a or 12b is allocated. It is exemplarily assumed in FIG. 2 that the transport stream packet 12a and the transport stream packet 12b are allocated with different data sinks.

In FIG. 2 it is also assumed exemplarily that for the data sinks 20, to which the transport stream packets 12a and 12b are allocated, the data streams 36 which are addressed to the same are embedded by fragmentation into the payload data sections 48 of the respective transport stream packets 12a, 12b which are allocated to the respective data sink 20. Every transport stream packet into which a start of one of the data packets of the embedded data stream falls thus comprises in the transport stream packet header 50 a pointer information 56 which indicates 58 where in the payload data section 48 of the respective transport stream packets the start of the data packet 62 lies which starts in the respective transport stream packet 12a. In the residual part of the payload data section 48 an end section 64 of the directly preceding data packet of the data stream for this data sink is located which is not yet located in one of the preceding transport stream packets for the respective data sink. In case of FIG. 2, such a falling of a start 60 into a payload data section 48 is exemplarily illustrated for the transport stream packet 12a. It is exemplarily illustrated with respect to the transport stream packet 12b in FIG. 2 that there may also be the possibility, however, that a transport stream packet comprises no pointer information 56 in its transport stream packet header 50 as, for example, the start of a data packet for the data sink to which the transport stream packet 12b is allocated, coincides with the start of the payload data section 48, or as the content of the payload data section 48 corresponds to a continuation of a current data packet which goes beyond the payload data section 48, however, or up to the end of the payload data section 48. It is to be briefly noted here that in the payload data section 48, apart from strictly payload data for data packets also fill bits or fill information may exist like e.g. when adding pointer information 56 would lead to the fact that the current data packet would end exactly with the end of the payload data section 48, so that the following data packet could not begin in the current payload data section anymore and a lack of the pointer information 56 would then lead to the fact that at the end of the payload data section 48 there is still space available. The latter applies at least when, for example, the transport stream packets 12a and 12b have a predetermined length, or a length which may only be set in predetermined quantization stages. The quantization stage may also be indicated in the transport stream packet header 50 or in a different, more irregularly transmitted way.

The embodiment of FIG. 2 thus shows that transport stream packets 12b, into which no start 60 of one of the data packets 38 falls which are allocated with the allocated data sink 20, comprise no pointer information, so that the payload data section 48 of the transport stream packets into which no start 60 falls, as compared to the payload data section 48 of transport stream packets 12a into which such a start 60 falls, may be increased by a lack or omission of the pointer information, i.e. by the length of the field indication 56. In other words, the transport stream packet header 50 of the transport stream packet 12b may be smaller by the length of the pointer information 56 as compared to the transport stream packet header 50 and accordingly the payload data section 48 of the transport stream packet 12b may be increased as compared to the payload data section 48 of the transport stream packet 12a. A flag 66 in the transport stream packet header 50 of each transport stream packet 12a, b might indicate whether or not pointer information 56 exists in the respective transport stream packet header 50.

Slightly above the transport layer plane 46, in FIG. 2 the protocol plane 68 of the data streams 36 is indicated, like e.g. of the data stream to which the transport stream packet 12a is allocated. In FIG. 2, a section having four subsequent data packets $38_{a-d}$ is illustrated exemplarily. Exemplarily, the data packet 38b is the one whose start 60 falls into the payload data section 48 of the transport stream packet 12a and whose first part thus corresponds to the section 62 in the payload data section 48 of this transport stream packet 12a. The following part 70 of this data packet 38b would be written into the payload data section of a following transport stream packet associated with this data sink according to the fragmentary embedding, wherein possibly again pointer information points to the start of the following data packet 38c in this payload data section if section 70 is not too long, etc.

It is to be mentioned briefly that, although it was suggested up to now in the description of FIG. 2 that the data packets 38$_a$-38$_d$ may be coordinated data packets belonging to a common order, further data packets may be interspersed into the stream of data packets 38$_{a-d}$ which take over a different function, like e.g. the transmission of a systematic forward error protection code for the other data packets. Thus, for example, the data packets 38$_a$-38$_a$ may be MPE sections between which MPE-FEC sections are interspersed. With respect to section 70 this may mean that the same is not contained in the directly following transport stream packet allocated to the respective data sink but only in a next but one or even later transport stream packet.

As it is illustrated in FIG. 2, again each of the data packets 38$_{a-d}$ may comprise a respective payload data section 72 and a data packet header 74. Additionally, each data packet 38$_{a-d}$ may also comprise a systematic error protection code which forms, together with the respective data word 38$_{a-d}$ including header 74 and payload data section 72, a systematic forward error code word, but for reasons of clarity this possibility is not illustrated in FIG. 2. It is illustrated, however, that for example each data packet header 74 may comprise a redundancy data section 76 by which the header 74 forms a systematic forward error code word for error detection and/or error correction in which the residual part 78 of the header 74 comprises a corresponding forward error detection/correction relation with respect to this redundancy data part 76.

In contrast to the transport stream packets 12a, 12b the data packets 38$_{a-d}$ of FIG. 2 exemplarily comprise a varying length and for indicating the length for example comprise a length indication 80 in their data packet header which indicates the length of the respective data packet 38$_{a-d}$.

Additionally, the data packet headers 74 for example comprise an address field 82 which for example uniquely indicates the data sink to which the data stream 36 is allocated or which is at least for example uniquely allocated to the same. The uniqueness may relate to address indications in data packets of data streams of other data sinks. A further field 84 in the data packet headers 74 may exist to for example comprise a uniform value for all data packets for synchronization purposes or the like, or a value which is at least the same for all data packets of the same type, like e.g. for MPE sections on the one hand and MPE packets on the other hand.

It is further indicated in FIG. 2 that into the payload data sections 72 of the data packets 38$_{a-d}$ further a data stream 86 of an even higher protocol level or plane 88 may be embedded, wherein this embedding exemplarily provides that data packets 90 of this data stream, for example without fragmentation, are each individually embedded into a payload data section 72 of a data packet 38$_{a-d}$ as exemplarily illustrated in FIG. 2 by dotted lines. The data packets 90 may thus, for example, also comprise a varying length. Just like the data packets of the lower protocol layer 68 they may each comprise a payload data section 92 and a header 94, and in the header 94 for example also a length indication 96 may be contained, which indicates the length of the respective packet 90. Additionally, in each packet 94 further exemplarily an address field 98 may exist which indicates the addressed data sink or is in a unique connection with the addressed data sink of the data stream 36.

After with reference to FIG. 2 a possibility for a setup of a transport stream packet and the embedding of the data streams of the data sinks 20 in FIG. 1 into the same was described, it is noted that the possibility of FIG. 2 of course only represents an exemplary possibility of a multitude of possibilities in connection with whom the embodiment of FIG. 1 would be useful in order to prevent discarding faulty transport stream packets as it is described in the following with reference to FIGS. 1 and 2. In the embodiment of FIG. 2, for example, the data stream 36 may be an MPE data stream and the data stream 86 may be an IP data stream. As already mentioned, the data packets 38$_{a-d}$ may be forward error protection code protected, wherein the forward error protection code may be positioned in data packets of the data stream 36 especially provided for this purpose. For this reason, the forward error code in FIG. 2 is only represented exemplarily at 100. As already mentioned, the forward error protection code 100 may be a systematic forward error protection code which is based on an interleaver functionality, according to which the forward error protection code 100 protects the payload data sections 72 of the data packets 38$_{a-d}$ in an arrangement in which the payload data sections 72 are entered into an interleaver table in the order of their occurrence in the data stream 36, like e.g. in columns, for example to form systematic forward error code words in lines with lines of this interleaver table on the one hand and a respective section of the FEC data 100 on the other hand. In FIG. 2 this is indicated at 102, where the interleaver table 104 forms one systematic forward error code word per line 106 with consecutive payload data sections a-e of the consecutive data packets 38$_a$-38$_d$, wherein the insertion in columns into the interleaver table 104 and the lateral addition of the redundancy data 100 to the interleaver table 104 is indicated.

Referring again to FIG. 1 it becomes clear by a comparison of FIGS. 1 and 2 that each probability value determiner 28 has many different possibilities to determine the respective probability value for the respective sink 20, wherein concrete examples in this respect are described in the following. As already indicated above, all of these individual contributions may end in probability value contributions which are then added up to acquire the respective final probability value for the respective data sink 20 which is then used in the allocator 30 together with the other probability values of the other data sinks 20 to determine the data sink to be finally selected and inform 34 the divider 26 on it.

For example, in the probability value determiners 38 for each data sink 20 a first section of the current transport stream packet 12 is localized in a way constant for all data sinks 20 or constant only for the respective data sink 20 or depending on transport stream packets 12 already allocated previously to the respective data sink 20 as they arrive at the input of the probability value determiner 28. This first section may for example be the pointer information 56. If the pointer information 56 is arranged at the same position in the transport stream packets 12 or the transport stream packet headers 50 then the localization for all data sinks 20 in the probability value determiners 28 is the same. It may alternatively be the case that the transport stream packet headers 50 for the different data sinks 20 are different for some reasons and thus the position of the pointer information 56 for each data sink 20 in the allocated transport stream packets 12 is the same but is different for transport stream packets 12 which are allocated to other data sinks 20. Each probability value determiner 28 would then go to the pointer information 56 or the first section at a constant position which is different, however, to other probability value determines 28 in the current transport stream packet. The structure of the header 50 of the transport stream packets 12 allocated to the respective data sink 20 may of course also be derived from the transport stream packets 12 previously allocated to the respective data sink 20 in the determiners 28. As soon as this happened, the probability value determiners 28 for example localize a second section 62 of the current transport stream packet 12 depending on the content of the predetermined transport stream packet 12 in the first section, i.e. 56, i.e. as if the content of the predetermined transport stream packet 12 in the first section 56 actually was pointer information 56. In the transport stream packet 12b this assumption would obviously be wrong as indicated at 56'. If the content of section 56' of the transport stream packet 12b was used as pointer information, for example section 62' of the payload data section 48 would be localized as a second section. Each probability value determiner 28 would now analyze the second section 62 or 62' as to whether it may be the start of a data packet 38 allocated to the respective data sink 20 or not. For this purpose, the data sink may, for example, evaluate the address field 82 or the address field 98. I.e., at the position at which the respective field 82 or 98 ought to be arranged in section 62 or 62' if it is the start of a data packet addressed to the respective data sink 20, each probability value determiner 28 would compare the content there to the content of those sections which is otherwise typical for those fields in the data packets 38 or 90 for the respective data sink. The result would be a corresponding probability contribution which would be introduced into the respective probability value for the respective data sink 20 and based on which the allocator 30 executes the allocation. For example a measure for the similarity of the expected content and the actual content may be used as a contribution value, wherein the measure may be implemented very simply, i.e. binarily, so that the contribution would not be zero if they match and zero if they do not match.

After the preceding paragraph it may be the case that each probability value determiner 28 examines a first field 82 or 98 in the second section 62 simply with respect to whether it corresponds to information which is more or less constant for the respective data sink, like e.g. at least since the last allocation of a transport stream packet 12 to the respective data sink 20 by the distributor 26 or the allocator 30. It may also be the case that the probability value determiners 28 examine two fields in the second section 62 as to whether the same comprise a predetermined relation as it applies between the fields 78 and 76 in the headers 74 of the data packets $38_{a-d}$. This match or correspondence would maybe not be a data sink-individual indication with respect to the allocation of the current transport stream packet to the respective data sink 20, but the probability value determiners 28 might use this above mentioned examination to increase the probability contribution in case a content may be found in section 62 which comprises a similarity to the data sink-specific information, as the fact that the above mentioned correspondence in potential fields 82, 98 is not only a coincidence assumes that this is at least the start of a data packet $38_{a-d}$, independent of the addressed data sink. Also this probability contribution value may be used for the above mentioned summation for the final probability value for the respective data sink 20.

It was described up to here that the probability value determiners 28 examine a first field 110 of section 62 as to whether it is the content of a field 82 or 98 which allows an indication to addressing the respective data sink, and that two further fields 112 and 114 are examined as to whether they combine the fields 78 and 76 of headers 74, or comprise a systematic forward error detection code relation with respect to each other.

Additionally or alternatively, the determiners 28 may examine a fourth and fifth field as to whether the same have a predetermined relation with respect to each other which applies to redundant indications, i.e. whether these fields 116, 118 for example behave with respect to each other like fields 98, 82, which both somehow address the data sink 20. Also this connection or context may possibly not be data sink-specific but may be used by the determiners 28, for example for increasing the probability value if field 110 additionally turns out to be a field which probably is data sink-specific for the respective data sink, as it was described above.

The description of possible examination options for the determiners 28 up to now did not consider that due to the observation of the data packets 38 hitherto acquired from the allocated transport stream packets of the respective data sink 20 each determiner 28 also has certain expectations with respect to the content of a next transport stream packet for the respective data sink 20. It may thus for example be the case that each determiner 28, for a data sink 20, to which a transport stream packet 12 was last allocated, in which a data packet 38 allocated to the respective data sink 20 was located having a length 80 from which it may be gathered that said data packet extends beyond the transport stream packet allocated last to the respective data sink 20, depending on the length indication 80, localizes a section 120 at a beginning of the payload data section 48 of the current transport stream packet 12 and analyzes the same as to whether it may be a continuation of the not yet completed data packet of the respective data sink. For example, at the end of each data packet $38_{a-d}$ a flag may be contained which indicates the end of the respective data packet and a comparison of the corresponding position at the end of the section 120 to such an EOF flag may result in a further probability contribution value for the final probability value of the respective data sink. It may also be the case, however, that in section 120 a section of a data packet is located which contains data sink-specific information, like e.g. one of the fields 82 or 98. Also for such fields similarity examinations may be undertaken in order to determine further contribution values.

According to the previously described examples for possible examinations which may be undertaken by the determiner 28 to acquire corresponding probability contribution values, the determiners 28 each localize certain fields using certain assumptions which may again have been derived from information of previously allocated transport stream packets or not. If a correspondence or match results from these examinations, the probability for the respective data sink is certainly relatively high that the current transport stream packet 12 belongs to this data sink 20 as the correspondence was not determined in any position of the current transport stream packet but at a certain one. Additionally or alternatively it may be the case that each probability value determiner 28 also examines a random field in the current transport stream packet 12 as to whether the content of the same corresponds to information which is constant for the respective data sink 20, like e.g. at least since the last allocation of a transport stream packet 12 to the respective data sink. A data sink 20 may, by losing a transport stream packet directed to the same, have lost the overview as to where the start of a data packet directed to the same may potentially be located in the current transport stream packet, and thus one of the fields 98 or 82 may for example be located at a random position in the current transport stream packet. Additionally, the previously allocated transport stream packet may have been one which was faulty but was still allocated to the current data sink, which may have been justified or not justified, and thus for example the length indication 80 of the still to be completed data packet of the respective data sink may be faulty and the fields 98 and 82 of the subsequent data packet may be located at an unexpected different position. If similarities to typical contents of the value 82 and/or 98 are determined, of course, the resulting probability contribution value for the final probability value of the respective data sink 20 may be less than for the above mentioned examinations at certain predefined localized positions of the current transport stream package.

Similar to what was described above with reference to the localized fields, for example additionally or also alternatively an examination of further field pairs may be executed at random positions as to whether the same have a predetermined systematic forward error detection code relation to each other or a relation as it applies for redundant indications in the headers of the protocol planes 68 and 88. It may also be the case, however, that the latter examinations are executed at localized positions, i.e. depending on the position of the field at which a similarity with a data sink specific information resulted, as it is e.g. typical for fields 82 or 98, so that the probability is increased that this similarity at the random field at a random position has not resulted randomly.

Further, the determiners 28 may be implemented to utilize the fact that normally the length indication 80 of the data packets 38 is correlated with the pointer information 56. The reason for this is that, for example, the determiner 28 for the data sink 20 to which the data stream 36 in FIG. 2 is associated, on the basis of the length indication 80 and the size of the not yet received part 64 of the data packet 38$_a$, may assume with a high probability that the pointer information 56 of the transport stream packet to be expected next comprises pointer information 56 which bridges the size of this section 64, as it is also indicated in FIG. 2 by arrow 58. A respective comparison of the field 56 of the current transport stream packet to the length indication 80 of the data packet of the respective data sink received last may thus be used by corresponding determiners 28 for data sinks at which such data packets 38$_a$ which have not yet been completely received exist to again determine a probability contribution value.

It is frequently also the case that transport stream packets associated with a respective data sink 20 contain ones which are identical to each other or at least comprise the same contents. This may e.g. be the case when a certain data carousel is transmitted for the respective data sink. Identical contents of the transport stream packets 12 intermittingly recurring in the transport stream packets of such data sinks may for example relate to a signaling table for such a data carousel. The determiners 28 may be implemented to determine, for the respective data sink to which the determiner belongs, an intermittingly recurring identical content among the transport stream packets 12 already allocated previously to the respective data sink and to determine the probability value for the respective data sink then by a comparison of the contents of the payload data section of the current transport stream packet 12 to the intermittingly recurring identical content.

It was frequently pretended in the previous description that the data stream 36 were the one determined for the data sink. This is basically correct, but it is also correct in the embodiment of FIG. 2, of course, that the data stream 86 is the one addressed to the data sink 20. It is merely encapsulated into an encapsulating structure, i.e. into layer 68, and together with encapsulation data, i.e. the header data 74, of the encapsulation structure fragmented into the transport stream packets 12 allocated to the respective data sink 20. The determiner 28 may now determine, for the respective data sink 20 for which the determiner 28 is currently provided, several potential locations, like e.g. above mentioned locations 116 and 118, in the current transport stream packet 12 in which contents of the encapsulation data 74 comprising a predetermined relation with respect to each other on the one hand and of the data packets 90 of the data stream 86 addressed to the respective data sink 20 on the other hand may be located to determine the probability value or a corresponding probability contribution value for the final probability value for the respective data sink 20 on the basis of the fact whether between contents of the current transport stream packet 12 at the determined several potential locations 116, 118 the predetermined relation exist or not.

The just mentioned possibility of course only exists when the potential locations as expected lie in a transport stream packet and not in subsequent ones. It may for example be the case that the determiners additionally or alternatively determine one or several potential locations in the current transport stream packet 12 at which a content of the data packets of the data stream addressed to the respective data sink 20 may be located which comprises a predetermined relation to a content of the encapsulation data in one of the transport stream packets 12 already previously allocated to the respective data sink 20, and determine the probability value on the basis of the fact whether between contents of the predetermined transport stream packet at the one or several potential locations and the transport stream packets 12 already previously allocated to the respective data sink the respective relation exists or not. It may thus for example be the case that for a data sink which incompletely received a current data packet 38$_a$, the field 82 already belongs to the already received part of this data packet 38$_a$ wherein the field 98 of the data packet 90 embedded therein lies in the transport stream packet for the respective data sink which is still expected, which is why in this case the determiner 28 in a current transport stream packet would compare a position of the same corresponding to the field 98 to the content of the field 82 in order to acquire a (further) probability contribution value.

It is further to be noted that the probability contribution values mentioned above may also be combined differently and not by summation. For example, they may be multiplied with each other or the like. A mixture of such combination possibilities would also be possible.

A further condition may be utilized by the determiners 28 to determine a further probability contribution value, i.e. the fact that usually the time multiplex using which the data streams addressed to the different data sinks 20 are multiplexed into the transport stream packets 12 of the transport stream 14, i.e. the temporal change of the allocation of the serially arranged transport stream packets 12 of the transport stream 14 with respect to the individual data sinks 20 does not happen randomly but according to a predetermined pattern, like e.g. according to a certain rate/quality optimization method or the like, so that transport stream packets addressed to a certain data sink usually occur in the transport stream 14 with a predetermined time pattern. In this way, the determiners 28 may be implemented, when determining the probability value for the respective data sink 20, to consider a shorter and/or longer-term allocation frequency of past transport stream packets 12 of the respective data sink 20.

The effect of the above measures now is that the determiners 28 provide a probability value for each data sink 20 which makes it obvious for the allocator 30 to which data sink 20 the current faulty transport stream packet 12 currently belongs. This current transport stream packet 12 thus does not have to be discarded although the address indication 54 may not be assumed to be reliable.

The respective data sink 20 which receives its transport stream packet 12 despite being erroneous may use this transport stream packet or the corresponding payload data therein profitably by utilizing the forward error protection code 100 which is, for example, a systematic forward error protection code. If the forward error protection code 100 in the data stream 36 is a systematic forward error protection code with an interleaver functionality, due to the nevertheless allocated transport stream packet the respective data sink or its decoder 21 may completely fill the interleaver table 104 with a higher probability, so that decoding the data stream 38 at the respective data sink 20 by the decoder 21 of the respective data sink 20 is successful with a higher probability as the error correction eliminates the errors in the faulty or erroneous transport stream packet.

Figure 3:
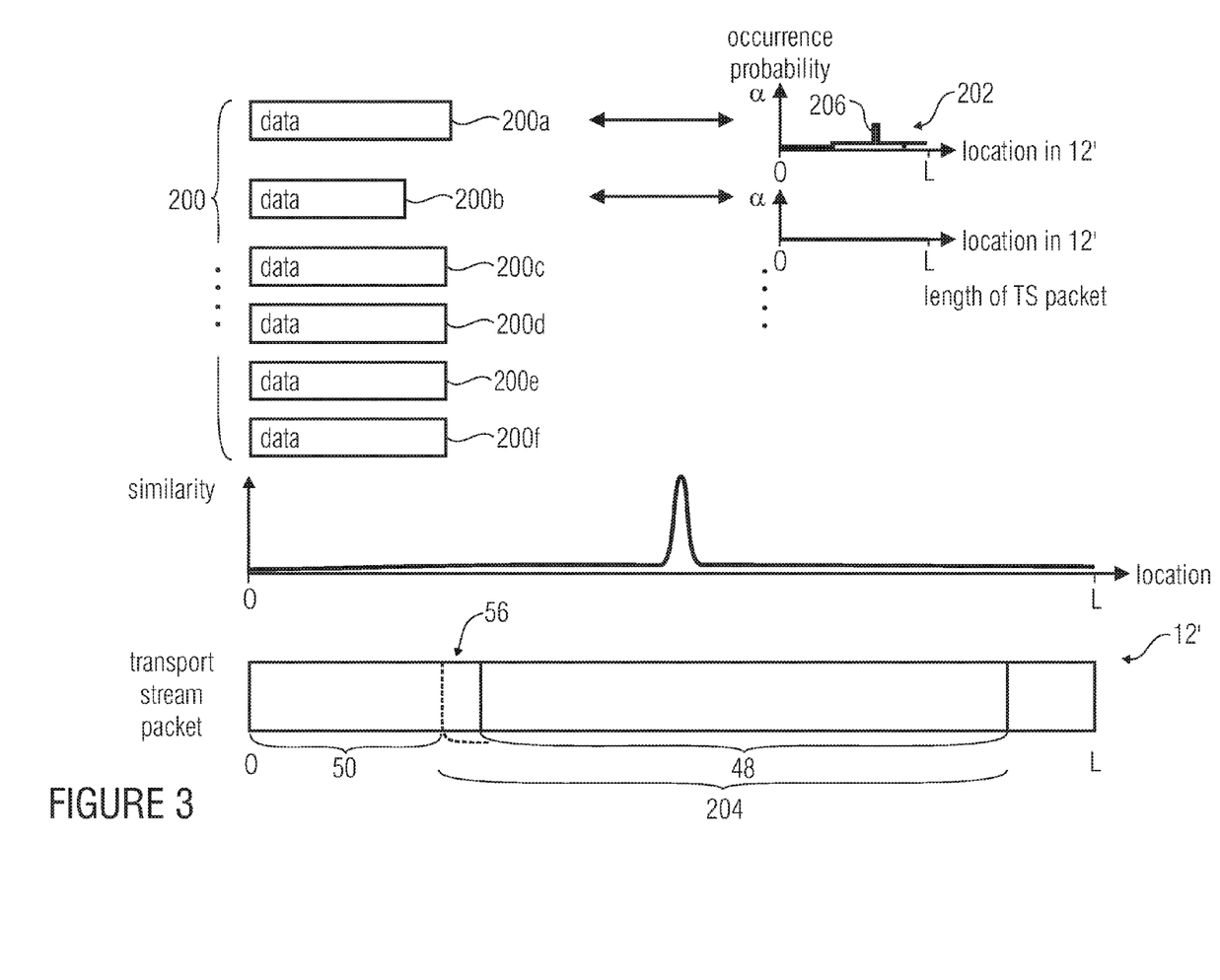
FIG. 3 is a schematic illustration of an internal state of a probability value determiner in—and for illustrating—the determination of an assumption probability value of the associated data sink according to one embodiment.

Before the embodiments which were described above with reference to FIGS. 1 and 2 are illustrated again in the following in different implementations with reference to concrete data formats, in the following again with reference to FIG. 3 it is tested to describe the functionality of the probability value calculator 28 from a somewhat different perspective. In FIG. 3, the current transport stream packet is illustrated by 12', as it is presented to an exemplary probability value calculator whose functionality is discussed also in behalf of the other probability value calculators in a slightly different way than above. FIG. 3 shows the state of the probability value calculator at the time at which the transport stream packet 12' is presented by the allocator 30 with the question whether the transport stream packet 12' indicated as being erroneous belongs to the associated data sink 20 or not. At this time, the probability value calculator 28 has a certain state which, among other things, distinguishes itself by certain data 200 which may temporally change more or less quickly. The state is data sink specific as will result from the following discussion; only the handling of the otherwise data specific data may be data sink unspecific.

Among the data are such, like e.g. 200a, 200b, which are data sink unspecific, like e.g. typical values for the content of the field 84 (FIG. 2) but also ones which are specific or even unique for the respective data sink, like e.g. the data 200c and 200d which may for example correspond to the content 82 or 98 of FIG. 2 for the respective data sink and remain unchanged across a larger number of data packets 90 or 38, and again data 200e and 200f which would be expected for certain fields of the transport stream packet 12' if the transport stream packet 12' were a transport stream packet for the respective data sink with an expected content in the payload data section, like e.g. the transport stream packet for the respective data sink with a missing part of the not yet completed data packet of this data sink which was received last, like e.g. the packet $38_a$ in FIG. 2, i.e. contents which do not occur in the data stream anymore as they more or less only apply only for a certain following data packet, thus so to speak change from data packet to data packet and thus only apply with a preceding data packet losslessness of the respective data sink. With respect to the last mentioned case, the data 200e and 200f may for example be an expected content of the pointing information 56 in the header of the transport stream packet 12'. Among the data sink specific data 200a, 200b there may be ones which are not contained in the payload data section 48 but in the header 50, like e.g. the identifier 54 itself, as it may be the case that a different section of the packet 12' is defect and the equality of the actual identifier content 54 to the one expected for the respective data sink 20 results in an increase of the probability that the concerned packet 12' belongs to this data sink 20.

To each of this data 200a-200f an occurrence probability distribution 202 may be allocated as it is exemplarily indicated in FIG. 3 for the piece of data 200a. The occurrence probability distribution 202 indicates with what probability the piece of data 200a is to be expected across all possible positions along the length L of the current transport stream packet 12'. The occurrence probability distribution 202 may be unchanged for a piece of data, like e.g. for the piece of data 200e which contains the expected content for the pointer information 56 or also represents part of the time-variable state of the probability value calculator 28. One of the data sink unspecific data 200a and 200b may for example only be located within the payload data section 48, as it is widely known, and then the occurrence probability distribution 202 for this piece of data 200a is only unequal zero within the possible extension range 204 of the payload data section 48. An increased peak 206 in the occurrence probability distribution course 202 may result depending on the current state of the probability value calculator 28, like e.g. from the expected leap information 200e based on the length indication 80 of the data packet received last only in pieces, wherein this length indication for example also represents one piece of the data 200. There may also be invariable occurrence probability distributions, like e.g. for data 200 which concerns the expected contents of the header 50. Among same are for example the leap information 56 or also information not mentioned previously which may exist, however, like e.g. a serial number in the headers of the transport stream packets allocated to a certain data sink. Such a serial number represents information of transport stream packets which changes in a way which is specific for the data sinks, from one transport stream packet allocated to a respective data sink to another transport stream packet allocated to a respective data sink.

Depending on the occurrence probability distribution course 202, now the probability value calculator 28 may determine the occurrence of similarities between the contents of the current transport stream packet 12' and the data 200 for all locations in the transport stream packet 12' or only for special locations. For different or all data 200 thus a similarity value results for all or several or one location(s) within the current transport stream packet 12', wherein in FIG. 3 exemplarily the similarity is illustrated as a continuous course across the transport stream packet 12'. A product of the similarity value with the corresponding occurrence probability value at a certain location at which the similarity was determined may now be used as the above described probability contribution value. This is executed for as much data 200 as possible, as it was described above, and these contribution values may then be summed up or multiplied, i.e. with a further weighting of these contributions or not.

With every allocation of a transport stream packet whether it was faulty or not faulty, the probability value determiner 28 updates its data 200 and thus its state as well as the occurrence probability distributions belonging to its state.

More generally speaking, for every data sink 20 a probability value determiner 28 exists and this probability value determiner 28 each has an individual data sink specific state which is updated by means of the content of a transport stream packet every time such a packet is allocated to the data sink. The states of the different probability value calculators 28 are thus different from each other. As these states are used, by a comparison of this state to the content of a currently questionable, erroneous transport stream packet 12', to determine how probable it is that same belongs to the inherent data sink 20, the probability values of the determiners 28 are differently high and the allocator 20 may select the data sink with the highest probability provided, for, the same exceeds—relative to the other probability values or absolutely—a certain minimum threshold.

With reference to FIG. 3 it is noted that the calculation of the peak 206 or its position for example corresponds to locating field positions, as mentioned in the previous description. This search or localization may take place on the basis of the pointer information 56 or by updating or forecasting where the new data packet will start in one of the following transport stream packets. This is what was described above. The similarity examination at the located position may correspond to the calculation of a bin of a corresponding cross correlation function at the corresponding offset position with the expected contents or to another similarity measure at the localized position between the defect transport stream packet 12' on the one hand and the expected content on the other hand.

Above embodiments are to be explained again in other words in the context of concrete broadcasting methods. Here, above embodiments show a possibility of error-tolerant decoding of encapsulated data streams or a receive method for encapsulated, packet-oriented data streams with distinguishable data sinks. It is enabled here to allocate erroneously received packets to individual data sinks although or even if the encapsulation structure is damaged. Implementations of above embodiments may among others, but not exclusively, support progressive and hierarchical error protection methods on the level of directly involved and neighboring protocol layers.

As encapsulation methods, for example, multi-protocol encapsulation (MPE) and generic stream encapsulation (GSE) may be mentioned which may, e.g., be used in the broadcasting methods DVB-H and DVB-SH.

As described above, a heuristic prediction model on the constitution of partially erroneously transmitted data packets may be used to allocate the same on the receiver side to one of several possible data sinks for a further decoding. Here, as described above, different findings regarding received packets may be utilized: a priori knowledge which is known due to the selected transmission standard, measuring of packet parameters which are constant or continuously predictable in a transmission, etc.

As described in FIG. 1, such parameters are collected and predicted for each data sink of previously received packets. For each further received packet, based on these findings, for each data sink an assumption probability may be calculated which calculation is executed by the above mentioned probability value calculators 28. Damaged packets 12 may then be allocated to the data sink 20 with the highest assumption probability. The use of a lower limit may prevent packets to be accepted which are damaged too much.

The implementation of the above embodiments only means the extension of known transmission methods on the receiver side. Compatibility with receive devices not prepared in this respect remains untouched. In other words, no changes have to be executed at the respective standards. Likewise, no modification has to be executed on the transmission side.

In other words, above embodiments describe an extension for receive methods for encapsulated data streams on the level of the transport and transmission layer. A case of application from this field is the encapsulation of network packets. With corresponding methods, the encapsulated data packets 90 are subsequently fragmented into transport packets 12. As generally in a system multiplex several payload data streams are transmitted encapsulated in parallel, the transport packets 12 are provided with an identification which allocates same to a data stream.

In the error-free case, the receiver of such data streams decides on the basis of this identification 54 to which payload data stream it allocates the received transport packet. If the same was received erroneously or at least the identification field was damaged, the transport packet which came in has to be discarded. Possibly, several following packets also have to be discarded until the protocol may again synchronize the payload data stream. Generally, these circumstances lead to a greater loss of payload data.

The intact frame allocation of the transport packets 12 themselves forms a precondition for using the above methods. This is generally given a priori in transport systems with a fixed packet length. A view onto all involved protocol layers is a further precondition. Thus, the above methods are part of the cross layer optimization.

By above methods, now additionally also erroneously received transport packets 12 are allocated to the individual payload data sinks 20. It is thus prevented that with several parallel data streams sinks 20 accidentally accept data which are actually not determined for the same and thus operate and correct on the basis of a faulty data basis.

In this respect an extraction and writing down or noting of parameters of the allocated payload data packets takes place (see FIG. 3). This updating takes place individually in each data sink. Here, such parameters are of interest which, from the sequential and temporal context, in advance comprise a high profile or strong predictability. This is for example parameters whose respective value is firmly predetermined in the standard. All parameters have a strong predictability which are constant during a transmission or subject to continuous value change. Examples for selecting such parameters are again listed in the following.

An erroneously received packet 12 is brought into relation with a data sink 20 with the help of a so called assumption probability. This probability is calculated by the sink or the associated calculator 28 from an amount of weighted rules for forming the assumption probability. These rules operate on the current updating state 200 of the data sink 20 and the corresponding parameters of the not yet allocated packet 12. The rules here have a close relation to the already above mentioned parameters; examples are again given when listing the same. Considering all rules by averaging including weighting an assumption probability may be calculated for every non-allocated packet for each data sink. This probability may optionally be directly used in the extended demultiplexer or in the allocator 30 to make a decision with formation of a maximum. Alternatively, the formation of a floating average value or similar filters may be connected upstream. The extended demultiplexer is characterized by the following elements: a distinction of cases for erroneously received transport packets 12, and in this case a subsequent execution of evaluation for the packet with all sinks 20. The result is then fed into the current demultiplexer as an alternative decision.

The assumption probability among others depends on the current state of the data sink 20. The rules per se are partially complex. They initiate search processes within the transport stream packet 12 to be analyzed and adjust the updated parameters 200 in case of a successful search for certain patterns within the packets which indicate a restart point with high certainty. A restart point here is a meaningful and verifiable pattern of a higher protocol layer 88 or 68 in the data stream. Apart from that also simple rules exist which analyze certain values at an expected location of occurrence and directly provide an assessment. Depending of the current state of the sink, individual rules for optimizing the computational effort are activated or deactivated.

The changed approach of the demultiplexer in case of an error (when receiving) is as follows: for the non-allocated packet 12 an assumption probability is formed with each data sink 20. The packet is subsequently allocated to the data sink 20 with the highest assumption probability. In addition, as described above, a filtering of the values may take place in advance. The data sink 20 itself further treats the packet according to the erroneous reception; methods for error checking or correction taking place there are used by the decoder 21 belonging to the sink in order to for example utilize the packet conditionally or correct the same for a further use.

Additionally, a lower threshold for receiving packets prevents data to be accepted caused by receiving strongly disturbed package transmission. This condition is detected as all sinks calculate comparatively low acceptance values for such a packet. Such packets are then finally discarded.

In the above methods a synergy effect exists by combination with forward error protection methods. Above methods enable the use of received data from a multiplex for a further processing with additional forward error protection methods which already existed according to the standards. By an allocation to individual sinks 20, the error protection of the respective sink 20 may still accept potentially damaged data blocks in a dedicated manner. Thus, the correction potential of the respective error protection is increased.

In the following, a detailed explanation is to be given using the example of the DVB-H standard with MPE. With the broadcast-based IP-Datacast method DVB-H the above described method may be used. Here, receiving IP packets 40 is done using Multi-Protocol Encapsulation (MPE). In the MPEG-2 transport stream 14 data dedicated to the same are distributed to individual transport stream packets 12. Addressing a transport stream packet to an MPEG sink 20 in the error-free case is done according to the standard by the so called "packet identifier" (PID), see 56.

By the above methods, also erroneously received transport stream packets 12' are allocated to the individual data sinks 20. In FIG. 1, the associated setup was illustrated. Each data sink 20 and its calculator 28 here manage the current parameters belonging to their portion of the transport stream, i.e. the incoming stream of packets for said sink 20. The transport stream demultiplexer 10 is extended so that with transport stream packets 12 with a set TEI flag (Transport Error Indicator), i.e. in case of detecting an error by the module 22, it uses the selection criteria according to the new method: Each data sink 20 or its calculator is questioned regarding its assumption probability with respect to the present transport stream packet. The packet is sent to the sink 20 having the highest return value. Data sinks 20 which may not decode erroneous packets discard the same upon reception. Specialized data sinks enable a further processing also with erroneous packets, however.

In the above described case of DVB-H, the new method according to FIGS. 1 to 3 may support the forward error correction MPE-FEC (Multi-Protocol-Encapsulation Forward-Error-Correction). The method thus enables the real conversion with several simultaneous MPE data streams 36 with error protection implementations which correct more aggressively than provided in the standard, i.e. e.g. progressive and hierarchical methods.

An MPE-FEC data sink 20 each manages a so called MPE-FEC frame which buffers data for a correction by the error protection block code RS(255,191,64) (see 100). When combining the above described handling of defect packets 12' with the MPE-FEC forward error protection, the data structure for storing the packet stream parameters may be located at a similar position as the one of the MPE-FEC frame and if applicable at the same protocol instance.

Above embodiments may directly be applied to, among others and not exclusively, other encapsulation methods like MPE and MPE-IFEC (Inter-burst FEC) (Digital Video Broadcasting Project (DVB) (editor): Digital Video Broadcasting (DVB); MPE-IFEG. Digital Video Broadcasting Project (DVB), 11 2008. (DVB Bluebook A131). http://www.dvb.org/) with the broadcasting standard DVB-SH, the corresponding methods of other broadcasting standards like ATSC (Standard ATSC N53, Part 1: 8 2009. ATSC Digital Television Standard: Part 1 Digital Television System. http://www.atsc.Org/) and others, etc.

Although many examples have been given, in the following rules for forming the assumption probability are again to be listed explicitly.

In the following, different parameters interesting for updating and corresponding rules for exploiting the parameters for the allocation of packets to data sinks are described. All rules may be used together by weighting for forming the assumption probability. Search specifications in these rules are utilized depending on time and effort when the sink internally detected a loss of synchronicity. This overview makes no claim to completeness. For an overview over corresponding protocol layers and errors of DVB-H reference is made to Jaekel, Torsten: *DVB-H Data Mapping.* 052006.—DiBroC.

Synchronicity is derived from the assumption probability itself or the frequency of actual packet allocations. Here, the average values of one past short-term and one past long-term time window each are compared. If the short-term value falls below a certain threshold below the long-term value it is to be assumed that the sink lost its synchronicity. Accordingly, the sink activates search instructions.

Length Fields like, e.g., 80 and 96 may be used as an indication for a data position for restarting. They give an indication where in one of the following transport stream packets 12 a new IP packet start is to be searched. Length fields exist on the level of MPE (see 68), IP (see 88) and UDP. All of them directly depend on each other with non-fragmented IP packets and are thus redundant. This relationship may thus also be used for a direct search for a restart point.

Fragment-Offset like, e.g., 56 is used with fragmented IP packets to signalize that a continuation part of an IP packet exists. An offset fitting the previous IP packets (see 38a) may be used as an indication for such a continuation.

IP Addresses, like e.g. 98 and 82, may often be uniquely allocated to an IP stream 86 or an MPE session 68. Thus, vice versa, an allocation of an IP address to an MPE sink 20 is made. It is further utilized that an amount of IP addresses which remain the same is used within an MPE session. The sudden occurrence of a new address is rather rare or even not to be found in the field of radio broadcasting. Both target and also source addresses are used with this relationship.

UDP Ports are generally subject to the same conditions as described above for IP addresses.

Selectors like TOS (Type of Service), TTL (Time to Live), protocol, flags, version are generally constant per session. Selectors are more uniquely subject to this condition than addresses. Also the field header length performs accordingly, formally is no selector, however.

IP Checksum (e.g. 76) of the protocol header gives information on the integrity of the protocol header. This integrity relation is used for the verification of a restart point. The search for a possible IP packet start in a transport stream packet is possible using this relation also by trying.

Multicast Addresses create a connection between the MAC address of the MPE header and the IP target address (Deering, Stephen E.: *Host Extensions for IP Multi-casting. Internet Engineering Task Force,* 8 1989. (RFC 1112). http.://tools.i- etf.org/html/rfc1112). Thus, they perform similar to the length fields distributed across several protocol levels. The use of multicast addresses is conventional with IP data cast.

PID (see 54) is unique for each sink (20) and is used by the demultiplexer for transport packets received intact in order to allocate the same. Also with an erroneously received packet this field may be inspected. If the PID is correct for the sink, this may be assessed positively.

Continuity Counter continuously counts within the packet stream for a PID. It may be used like the PID field to contribute to the calculation of the assumption probability.

Signaling Tables (PSI/SI) are regularly repeatedly transmitted in the transport stream. Here, the contents of most tables change comparatively rarely. The contents of incoming transport packets and those of already received tables may be compared with each other in order to derive whether a transport packet in question has to be allocated to a corresponding data sink for signaling. Here, also metrics may be used which check with respect to similarity.

In this document, encapsulation by the way designates the encapsulation of data streams of certain protocols into another protocol for transmitting the original data streams via an otherwise not compatible data transport as a transport path.

Broadcasting systems according to DVB-H (Standard ETSI EN 302 304; 11 2004. *Digital Video Broadcasting (DVB); Transmission System for Handheld Terminals (DVB-H)*. http://TilWW.etsi.org/, Specification ETSI TS 102585; 042008. *Digital Video Broadcasting (DVB); System Specifications for Satellite services to Handheld devices (SH) below 3 GHz*. http://www.etsi.org/) are IP-based systems which utilize the internet protocol for transmitting any media contents (radio, television, data services, software, etc.). Several media contents may here be combined into a DVB-H or DVB-SH multiplex for actual transmission. This takes place by encapsulating the IP data streams according to the method of multi-protocol encapsulation (MPE). (Standard ETSI EN 301 192; 04 2008. *Digital Video Broadcasting (DVB); DVB specification for data broadcasting*. http://www.etsi.Org/) which in turn is based on the packet transmission of DVB (Standard ISO/IEC 13818-1; 12 2000. *Information technology—Generic coding of moving pictures and associated audio information: Systems*. http://www.iso.org/).

When utilizing the IP datacast, in the above mentioned methods (DVB-H and DVB-SH) IP packets which in turn again contain UDP packets are transmitted by MPE. Here, the IP packets may be sent to multicast addresses. This is consequently provided by (Standard ETSI EN 302 304; 11 2004. *Digital Video Broadcasting (DVB); Transmission System for Handheld Terminals (DVB-H)*. http://TilWW.etsi.org/, Digital Video Broadcasting Project (DBV) (editor): *IP Datacast over DVBH: Content Delivery Protocols (CDP)*. Digital Video Broadcasting Project (DVB), 12 2005. (DVB Blubook A101). http://www.dvb.Org/, Schulzrinne, Henning; Casner, Stephen L.; Federick, Ron, Jacobson, Van: *RTP: A Transport Protocol for Real-Time Applications*. Internet Engineering Task Force, 7 2003. (RFC 3550). http://tools.ietf.org/html/rfc3550).

Compared to above embodiments, current implementations for demultiplexers of an MPEG2 transport stream are not implemented error-tolerantly. The allocation to a packet sink is exclusively done on the basis of the PID field of a transport packet. Packets with a set error indicator (TEI) are discarded. A detailed explanation of the transport stream is gien in (Standard ISO/IEC 13818-1; 12 2000. *Information technology—Generic coding of moving pictures and associated audio information: Systems*. http://www.iso.org/).

With DVB-H and DVB-SH, based on MPE, the error protection methods MPE-FEC and MPE-IFEC are introduced. Apart from the unchanged transmission of the payload data by this optionally error protection information may be sent along with the help of systematic error correction codes. Currently, with DVB-H, the method MPE-FEC may be used with the Reed-Solomon code RS (255,191,64) which allows an improvement of error protection within a time slot. With DVBSH, alternatively MPE-IFEC may be used with the same Reed-Solomon code. This method allows an error protection which spans several time slice bursts.

The algorithms for decoding these error protection mechanisms proposed and often implemented in the standard and the implementation guidelines (Digital Video Broadcasting Project (DVB) (editor): *DVB-H Implementation Guidelines*. Digital Video Broadcasting Project (DVB), 05 2007. (DVB Blluebook A092r2). http.://www.dvb.org/, Specification ETSI TS 102 584; 2010. Digital Video Broadcasting (DVB); DVB-SH *Implementation Guidelines Issue 2*. http://www.dvb.org/) only cover a basic functionality which exclusively relates to the network access layer and in favor of resource economy does not utilize all possibilities of error protection on the target system.

Thus, an erroneously received transport stream section leads to marking all of those covered table columns as being erroneous. Likewise, a transmission error results which only relates to one transport stream packet therein for canceling the complete transport stream section and again all columns touched by the same.

Apart from the above mentioned implementation variant, proposals exist for a progressive reconstruction of receive data which use MPE-FEC also in cases in which a CRC test fails on the level of transport stream sections (Koppelaar, A. G. C.; Eerenberg, O.; Tolhuizen, L. M. G. M.; Aue, V.: Restoration of IP-datagrams in the DVB-H link layer for TV on mobile. In: *Proc. Digest of Technical Papers. International Conference on Consumer Electronics ICCE '06*, 2006, Pg. 409-410).

Further proposals (Paavola, J.; Himmanen, H.; Jokela, T.; Poikonen, J.; Ipatov, V.: The Performance Analysis of MPE-FEC Decoding Methods at the DVB-H Link Layer for Efficient IP Packet Retrieval. In: *IEEE Transactions on Broadcasting* 53 (2007), 3, Pg. 263-275. http://dx.doLorg/10.1109/TBC.2007.891694. DOI 10.1109/TBC.2007.891694) include a hierarchical decoding of transmitted data. This is based on the progressive methods. In the decapsulation, it is differentiated for each group of received symbols (transport stream section, transport stream packet), whether the contained symbols were transmitted in a correct or unsafe way or not at all.

These methods typically consider information from the security layer (MPEG2-TS), like for example the TEI field to make more exact statements on the position of the erroneous symbols.

In order to allocate the erroneously received transport packets, in the above mentioned proposals for example their field continuity counter and PID are used. This presents a basically possible but only pragmatic approach. Above embodiments thus describe a substantially refined, accurate and thus extended handling for allocating erroneously received packets.

Although some aspects were described in connection with a device, it is obvious that those aspects also represent a description of the corresponding method, so that a block or a member of a device may also be regarded as a corresponding method step or as a feature of a method step. Analog to this, aspects which were described in connection with or as a method step also represent a description of a corresponding block or detail or feature of a corresponding device. Some or all of the method steps may be implemented by a hardware apparatus (or using a hardware apparatus), like for example a microprocessor, a programmable computer or an electronic circuit. In some embodiments some or several of the most important method steps may also be executed by such an apparatus.

Depending on certain implementation requirements, embodiments of the invention may be implemented in hardware or in software. The implementation may be executed using a digital storage medium, for example a floppy disk, a DVD, a Blu-ray disc, a CD, an ROM, a PROM, an EPROM, an EEPROM or a flash memory, a hard disk or another magnetic or optical memory on which electronically readable control signals are stored which may cooperate or do cooperate with a programmable computer system such that the respective method is executed. Thus, the digital storage medium may be computer-readable.

Some embodiments according to the invention thus include a data carrier comprising electronically readable control signals which are able to cooperate with a programmable computer system such that one of the methods described herein is executed.

In general, embodiments of the present invention may be implemented as a computer program product having a program code, wherein the program code is operable to execute one of the methods when the computer program product is executed on a computer.

The program code may for example also be stored on a machine-readable carrier.

Other embodiments include the computer program for executing one of the methods described herein, wherein the computer program is stored on a machine-readable carrier.

In other words, one embodiment of the inventive method thus is a computer program comprising a program code for executing one of the methods described herein, when the computer program is executed on a computer.

A further embodiment of the inventive method thus is a data carrier (or a digital storage medium or a computer readable medium) on which the computer program for executing one of the methods described herein is recorded.

A further embodiment of the inventive method thus is a data stream or a sequence of signals, which represent the computer program for executing one of the methods described herein. The data stream or the sequence of signals may for example be configured in order to be transferred via a data communication connection, for example via the internet.

A further embodiment includes a processing means, for example a computer or a programmable logics device which is configured or adapted in order to execute one of the methods described herein.

A further embodiment includes a computer on which a computer program for executing one of the methods described herein is installed.

A further embodiment according to the invention includes a device or a system which is implemented to transfer a computer program for executing at least one of the methods described herein to a receiver. The transmission may take place electronically or optically. The receiver may for example be a computer, a mobile device, a memory device or a similar device. The device or the system may for example be a file server for transmitting the computer program to the receiver.

In some embodiments, a programmable logics device (for example a field programmable gate array, an FPGA) may be used to execute some or all functionalities of the methods described herein. In some embodiments, a field programmable gate array may cooperate with a microprocessor in order to execute one of the methods described herein. In general, in some embodiments the methods are executed by any hardware device. The same may be a universally usable hardware like a computer processor (CPU) or hardware which is specific for the methods, for example an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ABBREVIATIONS

DVB digital video broadcasting, standard family for transmitting broadcasting contents.
DVB-H DVB for handhelds, DVB system standard for terrestrial transmission to mobile terminal devices.
DVB-SH DVB for satellite handhelds, DVB system standard for satellite-supported and hybrid (sat./terr.) transmission to mobile terminal devices.
FEC Forward error correction
IP Internet protocol, the network layer protocol of the internet
IPDC Internet protocol datacast, transmission of mainly multi-media data streams with the help of internet protocols
MAC Medium access control, here the addressing level of Ethernet
MPE Multi-protocol encapsulation
MPE-FEC Standardized error protection with DVB-H on the basis of MPE with a Reed-Solomon FEC
MPE-IFEC MPE-inter-burst-FEC, standardized error protection with DVB-SH on the basis of MPE with a Reed-Solomon FEC (alternative Raptor-code) with additional interleaving on the error protection level distributed across several bursts
MPEG2-TS Motion Picture Experts Group Transport Stream, transport stream according to ISO/IEC 13818-1, i.e. the order of transmitted TSP, also referred to as MPEG-TS
Multicast transmission of an internet message to several receivers; in contrast to broadcast, here the message is only passed on to networks in which receivers for this message are located.
PID Packet identifier, service address on the level of MPEG2-TS. Allocates a TSP on the receiver side to a designated sink which further assesses this packet.
PSI/SI Program specific information/service information, additional data for signaling with DVB
RS Reed-Solomon block code, systematic forward error protection code
TEI Transport error indicator, bit switch in which the physical transmission layer makes entries on the receiver side, whether this TSP is erroneous.
TOS Type of service, field of the IP header
TSP MPEG-2 transport stream packet
TTL Time To Live, field of the IP header
UDP User datagram protocol, part of the internet protocol for packet-oriented data transmission (transport layer)

The invention claimed is:

1. A device for demultiplexing a packet-based transport stream of transport stream packets each provided with a systematic forward error detection code, wherein the transport stream packets are each allocated to one of a plurality of data sinks, so that into a payload data section of the transport stream packets allocated to the same data sink a data stream of forward error protection code-protected data packets which are addressed to the respective data sink is embedded, the device being implemented as a microprocessor configured to, a computer programmed to, or an electronic circuit designed to
   determine, for a predetermined transport stream packet which is erroneous according to the systematic forward error detection code, a probability value for each of the plurality of data sinks which indicates how probable it is that the predetermined transport stream packet is allocated to the respective data sink, and
   allocate the predetermined transport stream packet, on the basis of the probability values for the plurality of data sinks, to a selected one of the plurality of data sinks.

2. The device according to claim 1, wherein for each data sink the determination of the probability value is executed on the basis of information of the predetermined transport stream packet which is specific for the data sink, or changes in a way specific for the data sinks, from one transport stream packet allocated to a respective data sink to another transport stream packet allocated to a respective data sink.

3. The device according to claim 1, wherein for each data sink the determination of the probability value is executed on the basis of an analysis of a time multiplex of previous transport stream packets.

4. The device according to claim 1, wherein for each data sink the determination of the probability value is executed on the basis of information of the payload data section of the predetermined transport stream packet.

5. The device according to claim 1, wherein for each data sink the data stream which is addressed to the respective data sink is embedded by fragmentation into the payload data sections of the transport stream packet which are associated to the respective data sink, wherein the transport stream packets into which a start of one of the data packets falls comprise one piece of pointer information each which indicates where to in the payload data section of the respective transport stream packet the start of the respective data packet falls, wherein the device is implemented to
   localize for each data sink a first section of the predetermined transport stream packet in a way constant for all data sinks or constant for the respective data sink or depending on transport stream packets already previously allocated to the respective data sink,
   localize a second section of the predetermined transport stream packet depending on a content of the predetermined transport stream packet at the first section as if the content of the predetermined transport stream packet in the first section was pointer information,
   analyze the second section as to whether it may be the start of a data packet allocated to the respective data sink, and
   depending on a result of the analysis, determine the probability value for the respective data sink.

6. The device according to claim 5, wherein the device is implemented to check for each data sink in the analysis whether it may be the start of a data packet allocated to the respective data sink,
   whether a first field in the second section corresponds to information which is constant for the respective data sink at least since the last allocation of a transport stream packet to the respective data sink,
   whether a second field in the second section comprises a predetermined relation to a third field in the second section as it applies for redundant indications in encapsulation data and header data of the data packets allocated to the respective data sink, and/or
   whether a fourth field in the second section comprises a predetermined systematic forward error detection code relation to a fifth field in the second section.

7. The device according to claim 5, wherein the transport stream packets into which no start of the one of the data packets falls which are allocated to the respective data sink comprise no pointer information, so that the payload data section of the transport stream packets into which no start of one of the data packets falls is increased, by an absence of the pointer information, compared to the payload data section of the transport stream packets into which a start of one of the data packets falls, the device being implemented to
   localize a third section at a start of the payload data section of the predetermined transport stream packet, for each data sink to which a transport stream packet was allocated last in which a data packet allocated to the respective data sink and comprising a length indication was located from which it may be gathered that said data packet extends beyond the transport stream packet allocated last to the respective data sink, depending on the length indication,
   analyze the third section as to whether it may be a continuation of the same data packet, and
   depending on a result of the analysis, determine the probability value for the respective data sink.

8. The device according to claim 1, wherein the device is implemented to determine the probability value for each data sink depending on whether
   a random field in the predetermined transport stream packet corresponds to information which has been constant for the respective data sink at least since the last allocation of a transport stream packet to the respective data sink,
   a first random pair of fields in the predetermined transport stream packet which comprise a first predetermined positional relation with respect to each other, comprise a predetermined relation with regard to content with respect to each other as it applies to redundant indications in encapsulation data and header data of the data packets allocated to the respective data sink, and/or
   a first random pair of fields in the predetermined transport steam packet which comprise a second predetermined positional relation with respect to each other comprise a predetermined systematic forward error detection code-relation with respect to each other.

9. The device according to claim 1, wherein for each data sink the data packets of the data stream addressed to the at least one data sink are embedded by fragmentation into the payload data sections of the transport stream packets allocated to the respective data sink, and each data packet of the data stream addressed to the respective data sink comprises a length field comprising a length indication indicating a length of a respective data packet, and wherein the transport stream packets comprise pointer information which indicates where in the payload data sections of the transport stream packets the starts of the data packets lie, wherein the device is implemented to
   for each data sink, determine the probability value for the respective data sink on the basis of a comparison of the length indication of a last data packet which started in one of the transport stream packets already allocated to the respective data sink and the pointer information of the predetermined transport stream packet.

10. The device according to claim 1, wherein for each data sink the data packets of the data stream which is allocated to the respective data sink each comprise at least one data sink-related indication, wherein the device is implemented to determine one or several potential locations in the predetermined transport stream packet for each data sink, in which a data sink-related indication might be located, and determine the probability value for the respective data sink by a comparison of a content of the predetermined transport stream packet at the one or several potential locations to a data sink-related state value of the respective data sink which has been constant at least since a last allocation of a transport stream packet to the respective data sink.

11. The device according to claim 1, the device being implemented to determine for each data sink among the transport stream packets already previously allocated to the respective data sink, an intermittingly recurring identical content, and determine, for each data sink, the probability value for the respective data sink, by a comparison of a content of the payload data section of the predetermined transport stream packet to the intermittingly recurring identical content.

12. The device according to claim 1, wherein for each data sink the data stream addressed to the respective data sink is encapsulated into an encapsulation structure and fragmented together with encapsulation data of the encapsulation structure into the transport stream packets allocated to the respective data sink, wherein the device is implemented to determine, for the respective data sink, several potential locations in the transport stream packet where contents of the encapsulation data and the data packets of the data stream addressed to the respective data sink which comprise a predetermined relation with respect to each other may be located and to determine the probability value for the respective data sink on the basis of whether between contents of the predetermined transport stream packet at the determined several potential locations, the predetermined relation exists or not, or determine one or several potential locations in the predetermined transport stream packets where a content of the data packets of the data stream addressed to the respective data sink may be located comprising the predetermined relation to a content of the encapsulation data in one of the transport stream packets already previously allocated to the respective data sink, and to determine the probability value on the basis of whether between contents of the predetermined transport stream packet at the one or several potential locations and the encapsulation data in the transport stream packets already previously allocated to the respective data sink the predetermined relation exists or not.

13. The device according to claim 1, wherein the device is implemented to allocate transport stream packets which are error-free according to the systematic forward error detection code to the identified data sink based on an identification indication of the respective error-free transport stream packet identifying the data sink allocated to the same.

14. The device according to claim 1, wherein the device is implemented, when determining the probability value for each data sink, to consider a shorter and/or longer-term allocation frequency of past transport stream packets.

15. The device according to claim 1, wherein the device is implemented to allocate the predetermined transport stream packet on the basis of the probability values for the plurality of data sinks to the data sink comprising the highest probability value.

16. A system for decoding a data stream which is addressed to a predetermined data sink from a packet-based transport stream of transport stream packets each provided with a systematic forward error detection code, comprising a device according to claim 1; and a decoder for decoding the data stream embedded into the payload data sections of the transport stream packets allocated to the predetermined data sink by the device.

17. A method of demultiplexing a packet-based transport stream of transport stream packets each provided with a systematic forward error detection code, wherein the transport stream packets are each allocated to one of a plurality of data sinks, so that in a payload data section of the transport stream packets allocated to the same data sink a data stream of forward error protection code-protected data packets which are addressed to the respective data sink is embedded, the method being performed on a microprocessor, a programmable computer or an electronic circuit, and comprising determining, for a predetermined transport stream packet which is erroneous according to the systematic forward error detection code, a probability value for each of the plurality of data sinks which indicates how probable it is that the predetermined transport stream packet is allocated to the respective data sink, and allocating the predetermined transport stream packet, on the basis of the probability values for the plurality of data sinks, to a selected one of the plurality of data sinks.

18. A non-transitory computer-readable medium having stored thereon a computer program comprising a program code for executing the method according to claim 17, when the program is executed on a computer.

* * * * *